(12) United States Patent
Iino (10) Patent No.: US 6,986,479 B2
(45) Date of Patent: Jan. 17, 2006

(54) MAGNETIC TAPE CARTRIDGE AND ASSEMBLING METHOD THEREOF

(75) Inventor: Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 140 days.

(21) Appl. No.: 10/685,433

(22) Filed: Oct. 16, 2003

(65) Prior Publication Data

US 2004/0178291 A1 Sep. 16, 2004

(30) Foreign Application Priority Data

Oct. 18, 2002 (JP) ............................. 2002-304948
Oct. 21, 2002 (JP) ............................. 2002-305453

(51) Int. Cl.
*G11B 23/107* (2006.01)
(52) U.S. Cl. ..................................... 242/348; 360/132
(58) Field of Classification Search ............ 242/347.1, 242/348; 360/132, 133; 369/291
See application file for complete search history.

(56) References Cited

U.S. PATENT DOCUMENTS

| | | | | |
|---|---|---|---|---|
| 3,861,611 A | * | 1/1975 | Esashi | ..................... 242/347.1 |
| 4,488,191 A | * | 12/1984 | Oishi et al. | .................. 360/133 |
| 6,764,037 B2 | * | 7/2004 | Hancock et al. | ............ 242/348 |
| 2003/0094525 A1 | * | 5/2003 | Hiraguchi | ................... 242/348 |

FOREIGN PATENT DOCUMENTS

JP 11-265560 A 9/1999

* cited by examiner

*Primary Examiner*—William A. Rivera
(74) *Attorney, Agent, or Firm*—Sughrue Mion, PLLC (57) ABSTRACT

A magnetic tape cartridge includes a cartridge case consisting of an upper half and lower half; a magnetic tape pulling-out port formed at a corner of side wall of the cartridge case, a curved door opening/closing the tape pulling-out port, a guide groove guiding the door to universally slide in its opening/closing directions, a door-side spring hooking portion protrusively provided with the door, a case-side spring hooking portion formed in an inner surface of the cartridge case, a tensile coil spring, of which one end of the coil spring is hooked in the door-side spring hooking portion and the other end of the coil spring is hooked in the case-side spring hooking portion, energizing the door to a closing position of the tape pulling-out port, and a spring putting platform provided neighboring the door-side spring hooking portion, and for receiving the tensile coil spring in a state in which the tensile coil spring is temporarily assembled on the door side spring hooking portion.

20 Claims, 11 Drawing Sheets

FIG.4A First Step

FIG.4B Second Step

FIG.4C Third Step

FIG.4D Fourth Step

MAGNETIC TAPE CARTRIDGE AND ASSEMBLING METHOD THEREOF

FIELD OF THE INVENTION

The present invention relates to a magnetic tape cartridge and assembling method thereof and, more particularly, to the magnetic tape cartridge assembling method thereof building a door and tensile coil spring in a cartridge case.

BACKGROUND OF THE INVENTION

Generally, as an external recording medium for data backup of a computer and the like, there exists a magnetic tap cartridge composed by housing a single reel in winch a magnetic tape of a recording medium is wound (see FIG. 2 in Japan patent laid open publication 11-265560).

There exist various kinds of cartridges as this kind of magnetic tape cartridge, and in recent years, for the purpose of downsizing a drive unit, a magnetic tape cartridge which is composed so as to form a pulling-out port of a magnetic tape at a corner of side wall of a cartridge case and to open/close the pulling-out port by a curved shape door formed like a laterally long sheet has been developed to make the space of movements of a tape pulling-out mechanism small in the drive unit.

In such the magnetic tape cartridge, in order to open/close the door, structure is contemplated in that: making the door a universally slidable structure and providing the door with a door-side spring hooking portion; providing an inner surface of the cartridge case with a case-side spring hooking portion; always energizing the door toward its closing direction by a tensile coil spring hooked across the door-side spring hooking portion and case-side spring hooking portion; and pushing/moving a protrusion piece for operation formed on an outer surface of the door by an operating arm appended to a loading mechanism, thereby opening the door.

Then, as a method to automate building-in work of the door and tensile coil spring in the cartridge case in the manufacturing process of magnetic tape cartridge of such the structure, a building-in method which firstly grips the door with a robot hand and sets it in a guide groove, then grips the tensile coil spring with the robot hand, and attaches its one end to the door-side spring hooking portion provided in the door and its other end to the case-side spring hooking portion provided in an inner surface of the cartridge case is contemplated.

However, in the building-in method, if the door fitted in the guide groove oscillates and/or slants left/right, a position of the door-side spring hooking portion for the cartridge case displaces, so there exists a problem that work of attaching both ends of the tensile coil spring to the door-side spring hooking portion and the case-side spring hooking portion becomes difficult. Moreover, if a gap between the door and case-side spring hooking portion is narrow, there exists a problem that, in the work of attaching both ends of the tensile coil spring to the door-side spring hooking portion and the case-side spring hooking portion, it becomes difficult to insert the robot hand gripping the tensile coil spring between the door and case-side spring hooking portion. That is, in the building-in method, there exists a problem that the building-in work of the door and tensile coil spring is difficult.

SUMMARY OF THE INVENTION

An exemplary object of the present invention is to provide a magnetic tape cartridge which can easily realize building-in work of a curved door and tensile coil spring in a cartridge case, and an assembling method thereof.

A magnetic tape cartridge of the invention is characterized by being equipped with a cartridge case comprising an upper half and lower half, a magnetic tape pulling-out port formed at a corner of side wall of the cartridge case, a curved door opening/closing the magnetic tape pulling-out port, a guide groove guiding the door to universally slide in its opening/closing directions, a door-side spring hooking portion protrusively provided with the door, a case-side spring hooking portion formed in an inner surface of the cartridge case, a tensile coil spring, of which one end portion is hooked on the door-side spring hooking portion and the other end portion on the case-side spring hooking portion, always energizing the door to its closing direction, and a spring putting platform for receiving said tensile coil spring in a state in which said tensile coil spring is temporarily assembled on said door side spring hooking portion.

According to the magnetic tape cartridge of the invention, the tensile coil spring is placed on the spring putting platform, so it is easy to hold the spring coil when building it in the door and transporting it. Thus, the magnetic tape cartridge enables automation of building the door and tensile coil spring in the cartridge case to be facilitated.

In addition, the door and door-side spring hooking portion are composed through the spring putting platform, so component rigidity is improved, thereby durability for repeated tension of the tensile coil spring in operation being improved.

Another magnetic tape cartridge of the invention is characterized by being equipped with a cartridge case comprising an upper half and lower half; an opening, which pulls out a magnetic tape, formed at a corner of the cartridge case; a curved-shape door opening/closing the opening; a guide groove, which guides the door to universally slide in its opening/closing directions, formed in an inner surface of the cartridge case; a door-side spring hooking portion provided at the door; a case-side spring hooking portion formed in an inner surface of the cartridge case; and a tensile coil spring, of which one end portion is hooked on the door-side spring hooking portion and the other end portion on the case-side spring hooking portion, always energizing the door to its closing direction, wherein the door-side spring hooking portion is composed of a bar-shaped body protruding toward a farther opening side from an end portion of opening side of the door and a spring putting platform for receiving the tensile coil spring on an upper surface of the spring putting platform in a state in which said tensile coil spring is temporarily assembled on said case side spring hooking portion formed in an inner surface of said cartridge case.

In the magnetic tape cartridge, because the door-side spring hooking portion is composed of the bar-shaped body protruding backward from a front end portion of back of the door, the bar-shaped body can be inserted in an disposed place of the tensile coil spring if a place where the tensile coil spring is disposed is a narrow gap. Accordingly, if hooking one end of the tensile coil spring on the case-side spring hooking portion and positioning the tensile coil spring in the cartridge case by making the spring putting platform hold the tensile coil spring, the other end of the tensile coil spring can be easily hooked on the bar-shaped body (door-side spring hooking portion).

Such the magnetic tape cartridge enables the tensile coil spring to be hooked between the door-side spring hooking portion and case-side spring hooking portion without inserting a robot hand inserting between the door and case-side spring hooking portion if making a robot hand grip the door and move it to hook the other end of the tensile coil spring on the door-side spring hooking portion. Thus, the magnetic tape cartridge enables automation of building the door and tensile coil spring in the cartridge case to be facilitated.

BRIEF DESCRIPTION OF THE DRAWINGS

FIG. 4A, a first step; FIG. 4B, a second step; FIG. 4C, a third step; and FIG. 4D, a fourth step.

FIG. 5 is a perspective view of the first embodiment showing a state in which the slide door and a case-side spring hooking portion of the lower half are energized with a tensile coil spring and built in.

DESCRIPTION OF THE PREFERRED EMBODIMENTS a. First Embodiment

Hereinafter, the first embodiment of a magnetic tape cartridge and assembling method thereof related to the present invention will be described in detail, referring to drawings as needed.

Figure 1:
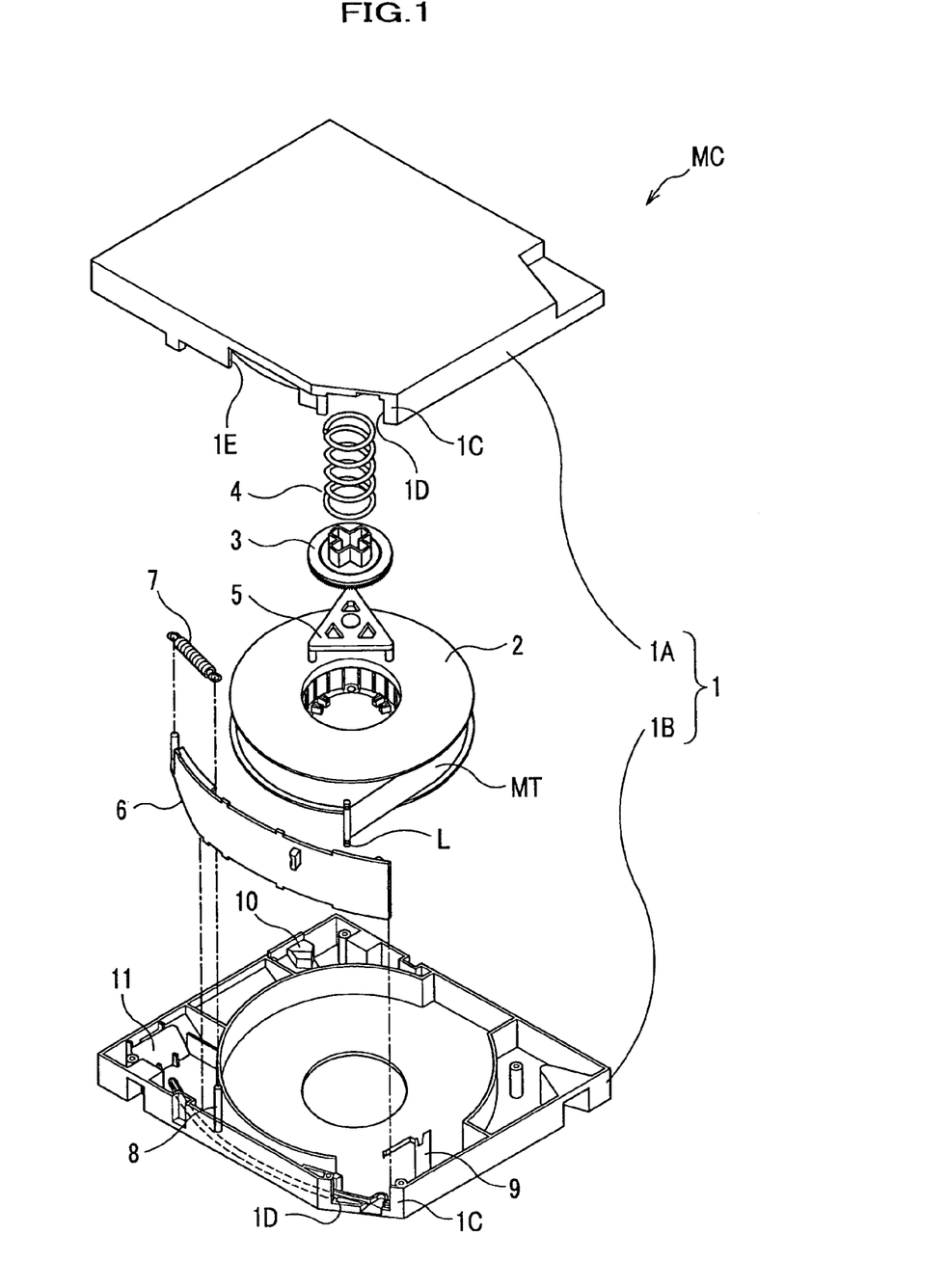
FIG.1 is an exploded perspective view showing a configuration of magnetic tape cartridge MC of a first embodiment related to the invention.
Figure 2:
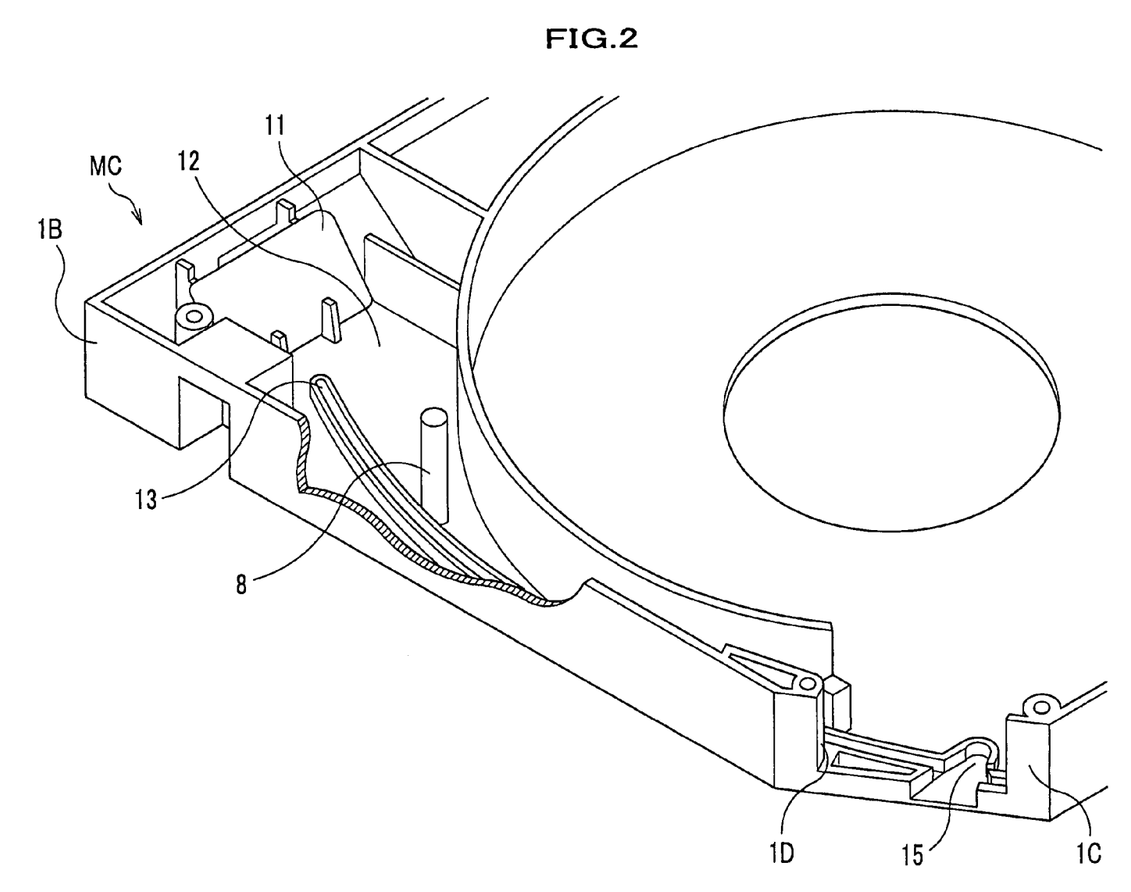
FIG. 2 is an enlarged perspective view showing a main portion of inner surface 12 of a lower half included in the magnetic tape cartridge MC of the first embodiment shown in FIG. 1.
Figure 3:
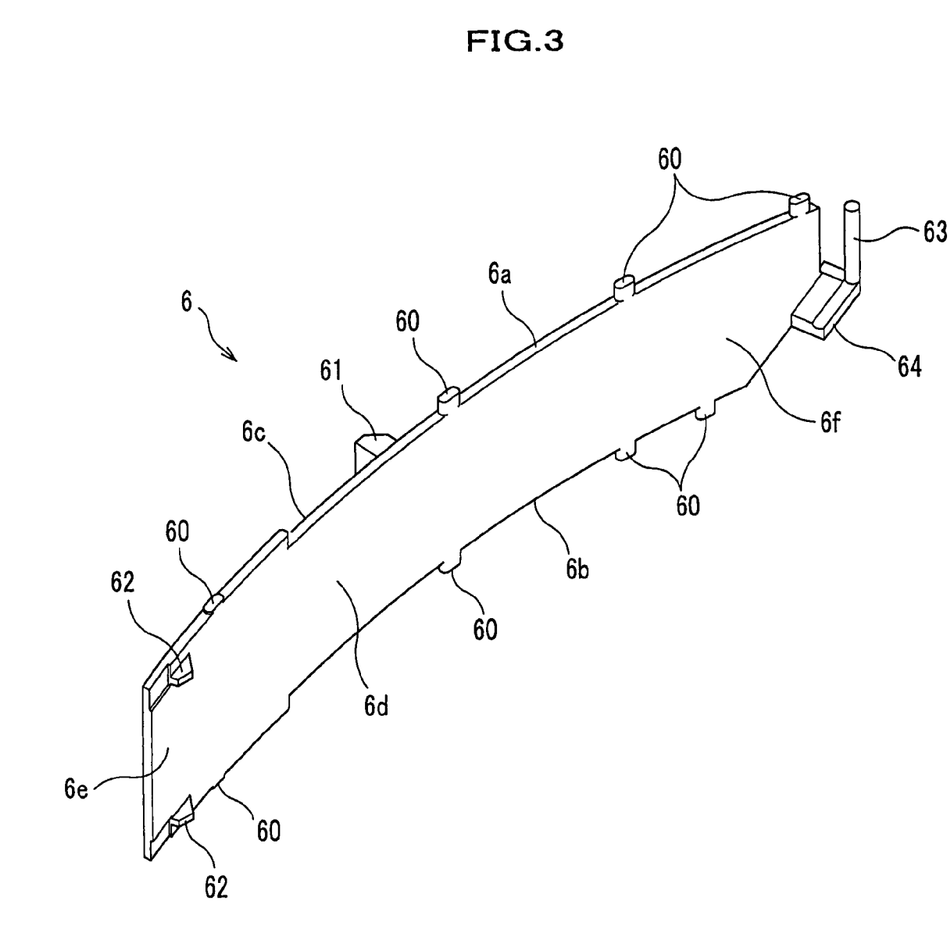
FIG. 3 is an enlarged perspective view showing a slide door included in the magnetic tape cartridge MC of the first embodiment shown in FIG. 1.

Firstly, the magnetic tape cartridge related to the invention is described referring to FIGS. 1, 2, and 3. Here, in an "upper half 1A and lower half 1B," an upper one in building-in is called the upper half 1A, whereas a lower one is called the "lower half 1B."

As shown in FIG. 1, a magnetic tape cartridge MC is composed of a single reel 2 in which a magnetic tape MT of a recording medium is wound, a lock plate 3 and compressing spring 4 to lock a rotation of the reel 2, a release pad 5 to unlock the reel 2, a magnetic tape pulling-out port 1D formed at a corner 1C of a cartridge case 1 across the upper half 1A and lower half 1B, a slide door 6 to open/close the magnetic tape pulling-out port 1D, a tensile coil spring 7 energizing the slide door 6 to a closing position of the tape pulling-out port 1D, a case-side spring hooking portion 8, a disc spring 9 engaging a leader pin L attached at a top end of the magnetic tape MT in a closed state of the slide door 6, an involuntary deletion preventing claw 10, a cartridge memory 11, and the like, built in the cartridge case 1 which is divided into the upper half 1A and lower half 1B. Meanwhile, the corner 1C of the cartridge case 1 is obliquely formed by a part of a side wall being cut away. Moreover, the "slide door 6" corresponds to a "door" in claims of the invention.

In addition, as shown in FIG. 2, a lower end 6b (see FIG. 3) of the slide door 6 is fitted in an inner surface 12 of the lower half 1B, and a curved shallow guide groove 13 guiding the slide door 6 to universally slide in its opening/closing directions during its opening/closing, a case-side spring hooking portion 8, a leader pin holding concave portion 15 holding a lower end of the leader pin L (see FIG. 1) engaged in the disc spring 9 (see FIG. 1), and the like are formed. Although not shown here in the drawings, also in an inner surface of the upper half 1A, the guide groove 13 formed in the inner surface 12 of the lower half 1B, a guide groove corresponding to the leader pin holding concave portion 15, an engaging portion corresponding to the case-side spring hooking portion 8 and a leader pin holding concave portion are formed.

The slide door 6, as shown in FIG. 3, is formed like a laterally long sheet and has a curved shape. Then, a plurality of sliding-use protrusions 60, which are fitted in the guide groove 13 formed in the upper half 1A and lower half 1B so as to universally slide, are formed in an upper end 6a and lower end 6b of the slide door 6.

On an outer surface (surface facing outside of the magnetic cartridge MC) 6c of the slide door 6, an operating-use protrusion piece 61 performing opening operation of the slide door 6 is protrusively provided. The operating-use protrusion piece 61 fronts in a operating-use opening 1E (see FIG. 1) formed on a side wall of the upper half 1A when the magnetic tape cartridge MC is assembled, and the opening operation of the slide door 6 is performed by pushing/moving the protrusion piece 61 with an operation arm appended to a loading mechanism of a drive unit.

In an inner surface (surface facing inside of the magnetic cartridge MC) 6d of the slide door 6, a door-side spring hooking portion 63 is protrusively provided at a back end portion (end portion which becomes an opening direction side when the door 6 is built in the lower half 1B) 6f of the door 6. Then, a spring putting platform 64 formed together with a base end of the door-side spring hooking portion 63 is provided.

Meanwhile, a shape of the door-side spring hooking portion 63 is not specifically restricted if it can attach one end of the tensile coil spring 7. Moreover, although the spring putting platform 64 is provided neighboring the door-side spring hooking portion 63, it is not always necessary to be together with the hooking portion 63 and a slight gap may exist between the platform 64 and hooking portion 63.

Moreover, in the inner surface 6d of the slide door 6, when the door 6 is in a closed state, stoppers 62 holding a lower end of the leader pin L (see FIG. 1) are formed at a front end portion (end portion which becomes a closing direction side when building the door 6 in the lower half 1B) 6e of the door 6.

Next, an assembling method related to the invention is described referring to FIGS. 4A, 4B, 4C, 4D, and 5. Meanwhile, in the embodiment, it is assumed that the tensile coil spring 7 temporary built in the lower half 1B is built in the lower half 1B of the cartridge case 1.

When assembling the magnetic tape cartridge MC, each component such as the upper half 1A, lower half 1B, reel 2, lock plate 3, compression coil spring 4, release pad 5, slide door 6, tensile coil spring 7, disc spring 9, involuntary deletion preventing claw 10, and cartridge memory 11, is provided on a transport pallet (not shown in the drawings), and in a building-in process of each component, each component is built in a predetermined position of the lower half 1B (see FIG. 1).

Here, according to four steps shown in FIGS. 4A to 4D, a method for building the slide door 6 and tensile coil spring 7 in the lower half 1B is described.

Firstly in the first step (see FIG. 4A), hook one end portion 7a of the tensile coil spring 7 in the door-side spring hook portion 63 of the slide door 6. Then in the second step (see FIG. 4B), place the coil spring 7 on the spring putting platform 64.

Next in the third step (see FIG. 4C), place the door 6 near to the guide groove 13 and hook the other end portion 7b of the coil spring 7 in the case-side spring hooking portion 8. Then, grip the door 6 so as to be slanted with respect to the lower half 1B so that a slant of the coil spring 7 becomes same as that of its built-in state.

Then in the fourth step (see FIG. 4D), expand the coil spring 7, move down the door 6 so as to match the guide groove 13, and engage the door 6 in the guide groove 13.

Figure 6:
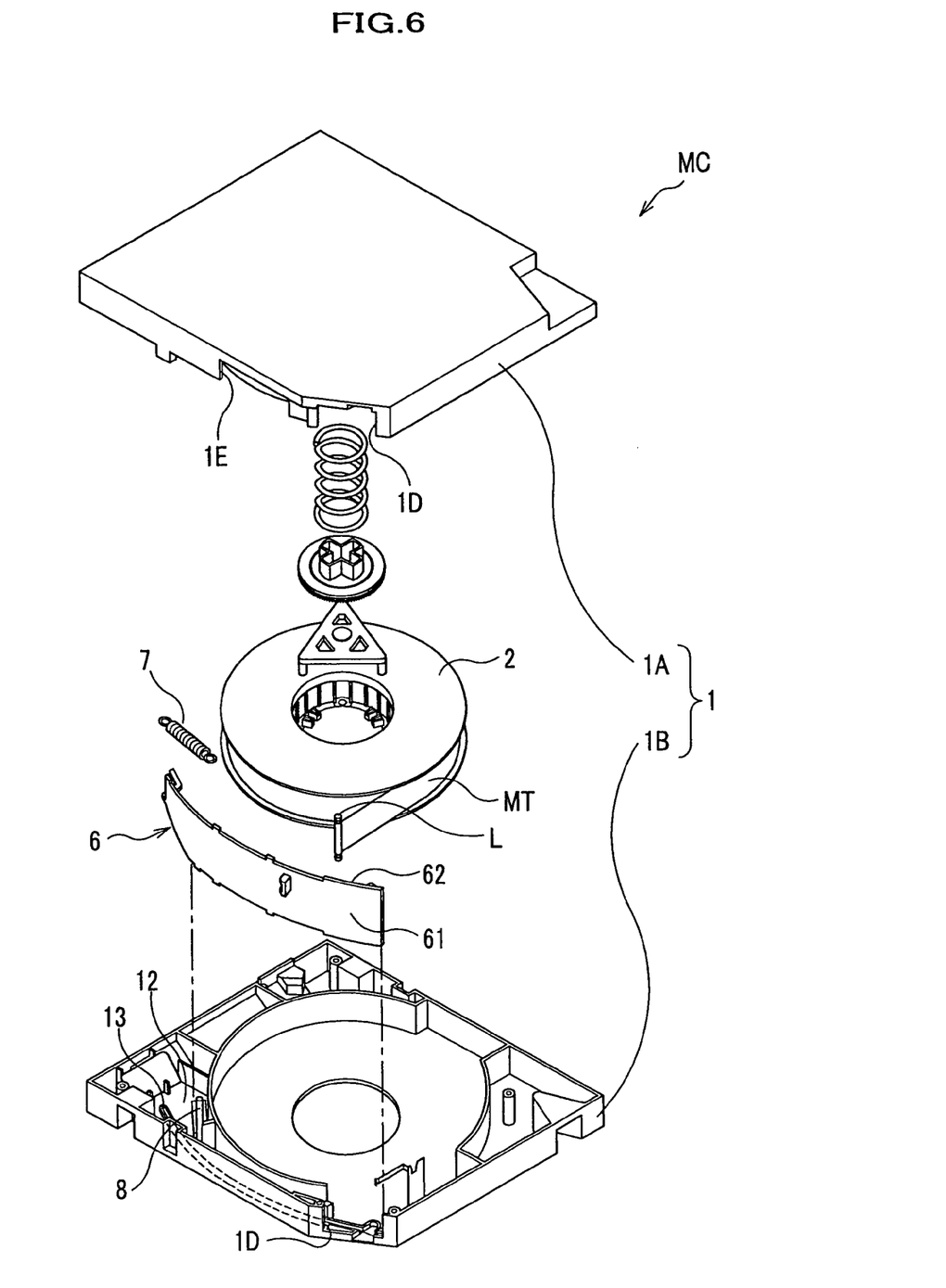
FIG. 6 is an exploded perspective view showing a configuration of magnetic tape cartridge MC of a second embodiment related to the invention.
Figure 7:
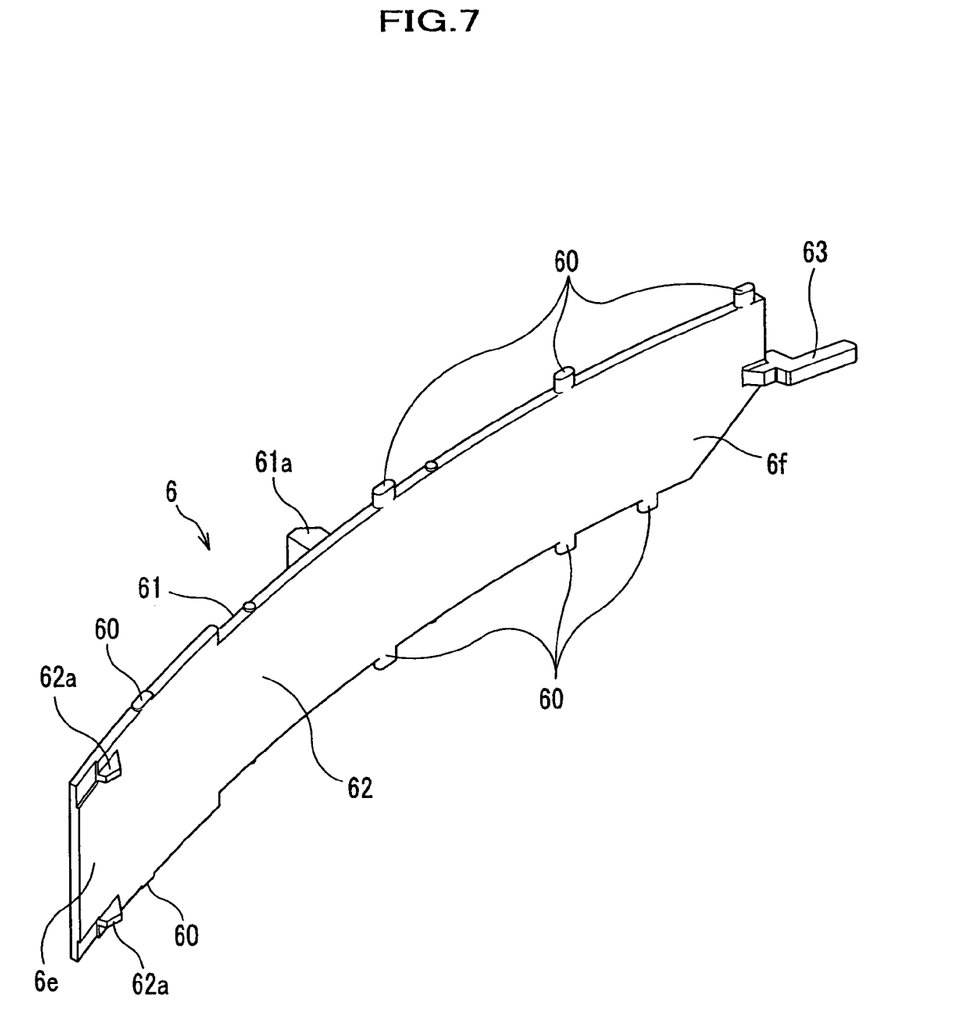
FIG. 7 is an enlarged perspective view showing a slide door included in the magnetic tape cartridge MC of the second embodiment shown in FIG. 6.

Lastly, if the door 6 is released as shown in FIG. 6, the coil spring 7 pulls the door-side spring hooking portion 63 and case-side spring hooking portion 8, and energizes the door 6 to the closing position of the magnetic tape pulling-out port D.

Meanwhile, in the embodiment, it is preferable for the tensile coil spring 7 to slant so that the spring 7 placed on the spring putting platform 64 positions at a lower side for its built-in state.

If positioned like this, in a use of a product, that is, in opening/closing of the door 6, it can be opened/closed without the spring 7 interfering with the spring putting platform 64.

In the embodiment, in the coil putting platform 64 it is preferable for a groove which regulates the spring 7 in a constant position to be formed.

If formed like this, the position of the spring 7 is easily determined, for example, even when the spring 7 is moved in a state in which the spring 7 is temporarily assembled on the door-side spring hooking portion 63, the spring 7 can be prevented from falling off during assembly.

Meanwhile, a shape of the groove 13 includes a concave shape with a cross section of the groove being a V-shape, semi-circle, and the like.

Figures 4A, 4B, 4C, 4D:
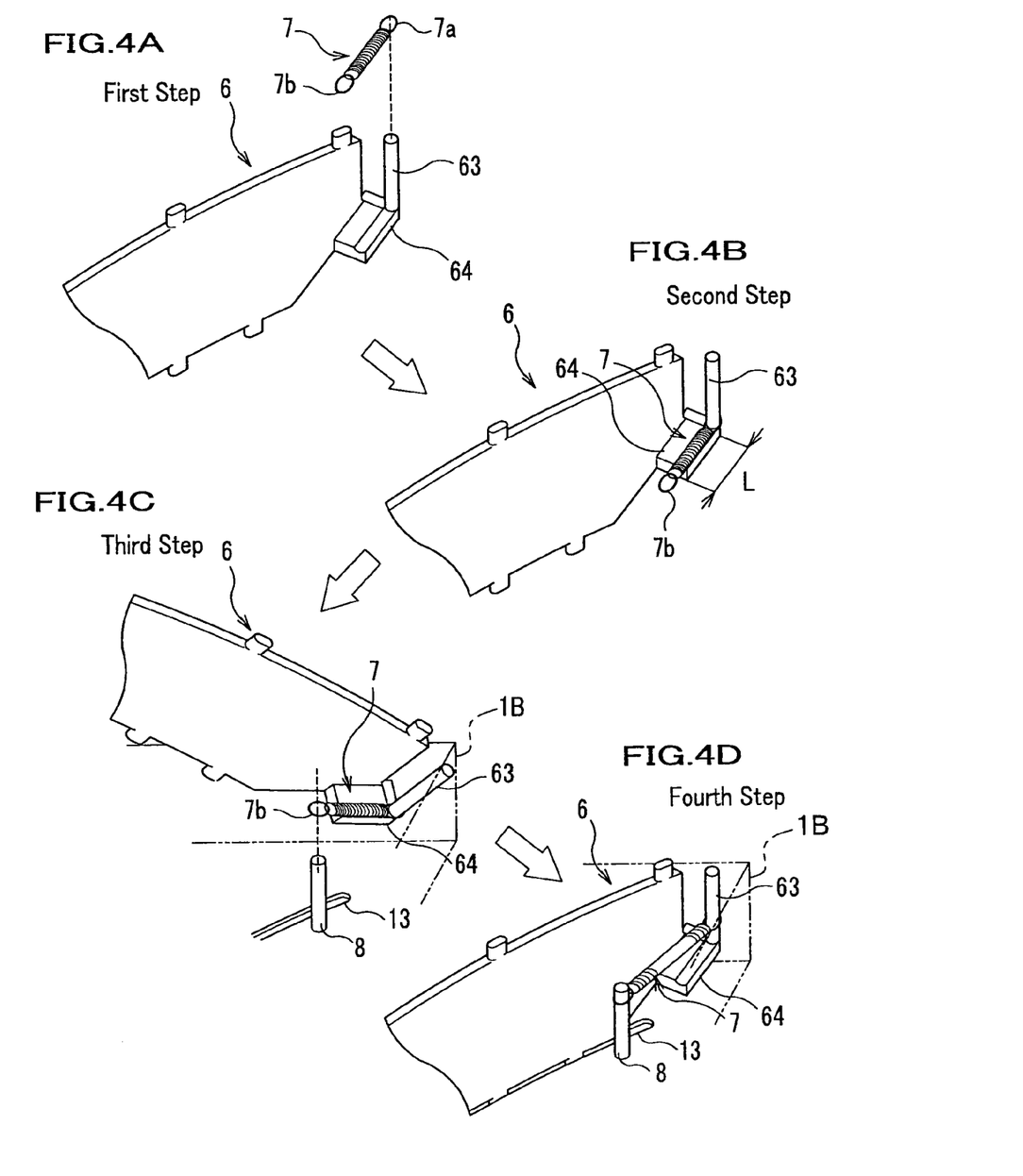
FIGS. 4A, 4B, 4C, and 4D are perspective views of the first embodiment showing building-in steps of a main portion of door-side spring portion of the slide door shown in FIG. 3.
Figure 5:
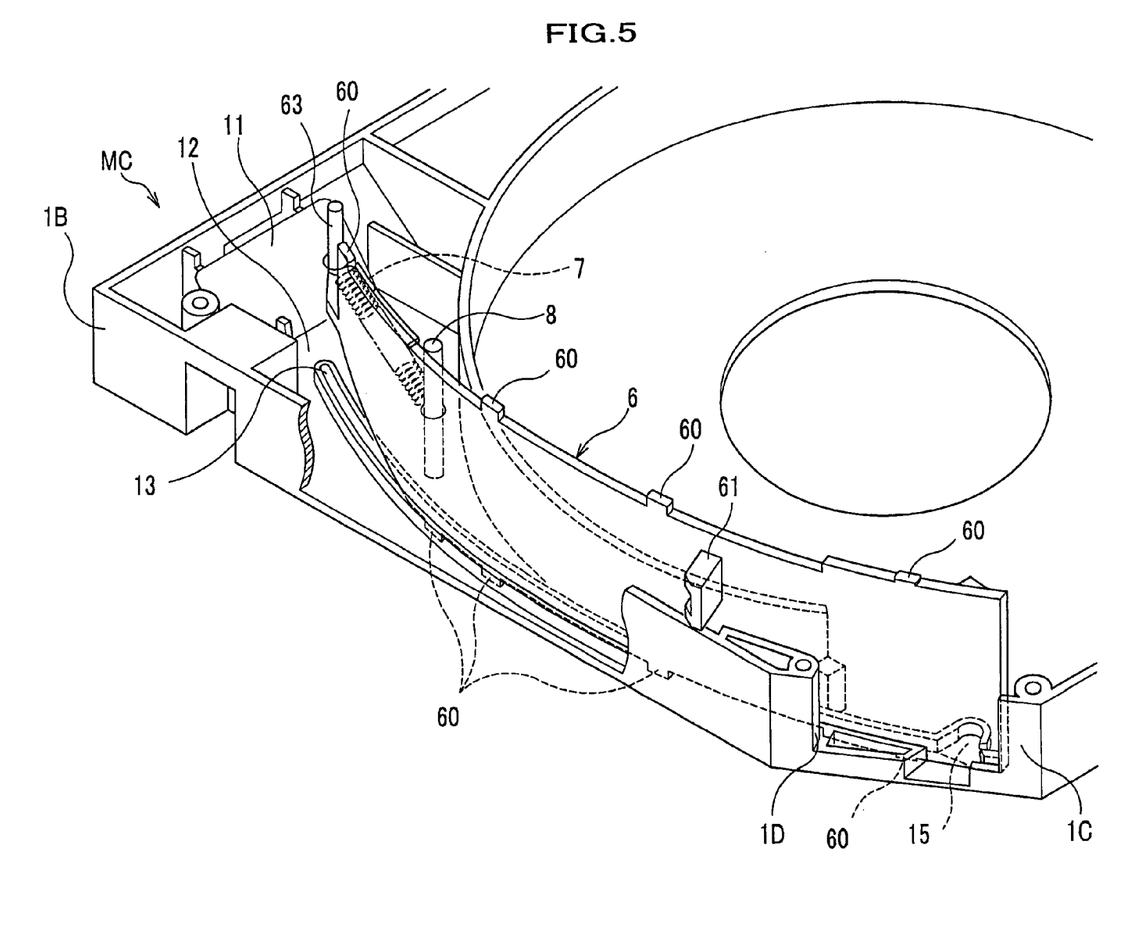

In the embodiment, it is preferable for a length of the spring putting platform 64 to be set so that the other end portion 7b is disposed outside the platform 64 in a state in which the spring 7 is placed on the platform 64, that is, so that the other end portion 7b of the spring 7 is run over from the platform 64. Meanwhile, a "length of the spring putting platform 64" is a spring putting platform largeness "L" (see FIG. 4) in a coil axis direction, when putting the spring 7 on the platform 64.

If set like this, in hooking the other end portion 7b of the spring 7 in the case-side spring hooking portion 8, the slide door 6 can be surely built in the cartridge case 1 without the spring putting platform 64 interfering with other components.

Moreover, when assembling the magnetic tape cartridge MC, it is preferable to assemble so as to include the first step hooking one end portion 7a of the spring 7 in the door-side spring hooking portion 63, the second step placing the spring 7 on the spring putting platform 64, the third step placing the door near to the guide groove 13 and hooking the other end portion 7b in the case-side spring hooking portion 8, and the fourth step fitting the door 6 in the guide groove 13 expanding the spring 7.

If assembled like this, a handling of the spring 7 becomes easy, thereby the building-in of the slide door 6 is easily automated.

In the assembling method of the first embodiment, when placing the door 6 near to the guide groove 13 in the third step, it is preferable for the door 6 to be gripped by being slanted with respect to the lower half 1B so that a slant of the spring 7 becomes the same as that of its built-in state.

b. Second Embodiment

Hereinafter, the second embodiment of a magnetic tape cartridge and assembling method thereof related to the invention will be described in detail, referring to drawings as needed.

Firstly, the magnetic tape cartridge related to the invention is described referring to FIGS. 6 to 11.

As shown in FIG. 6, a magnetic tape cartridge MC is equipped with a cartridge case 1 divided into an upper half 1A and lower half 1B. In the case 1, a reel 2 in which a magnetic tape MT is wound, a curved slide door 6, and a tensile coil spring 7 always energizing the slide door 6 in a closing direction are disposed. Here, in an "upper half 1A and lower half 1B," an upper one in building-in is called the upper half 1A, whereas a lower one is called the "lower half 1B."

The cartridge case 1 is approximately rectangular in its plan view, its one corner is obliquely formed to be chamfered, and a pulling-out port 1D of the magnetic tape MT is formed across the upper half 1A and lower half 1B. Then, on a bottom surface 12 of the lower half 1B, a curved guide groove 13 to which the slide door 6 is attached to be universally slidable, a case-side spring hooking portion 8 which is a pin-shaped protrusion to which one end of the tensile coil spring 7 is attached, and a spring putting platform (not shown in the drawings) described later are formed. Also not shown in the drawings, the guide groove is also formed in the upper half 1A same as in the lower half 1B.

In a state in which the slide door 6 is built in the cartridge case 1, the door 6 of which the outer surface 61 convexly curves and the inner surface 62 concavely curves is formed as a sheet-shape. Here, referring to FIG. 7, at upper/lower end edges of the slide door 6, protrusions 60 for sliding which universally slidably engage in guide grooves 13 of the upper half 1A and lower half 1B are formed. On the outer surface 61, an operating-use protrusion piece 61a which exposes from an operating-use opening 1E (see FIG. 6) formed in the cartridge case 1 (upper half 1A) to open/close the slide door 6 from outside is formed. In addition, at a front end portion 6e (end portion which becomes a closing direction side when built in) of the inner surface 62, a stopper 62a to restrain a leader pin L (see FIG. 6) attached at a top of the magnetic tape MT in a state of the slide door 6 being closed is formed. At a back end portion 6f of the slide door 6, a door-side hooking portion 63 to which the other end of the tensile coil spring 7 is attached is formed. The hooking portion 63 is composed of a bar-shaped body extending farther backward from the back end portion 6f.

Figure 8:
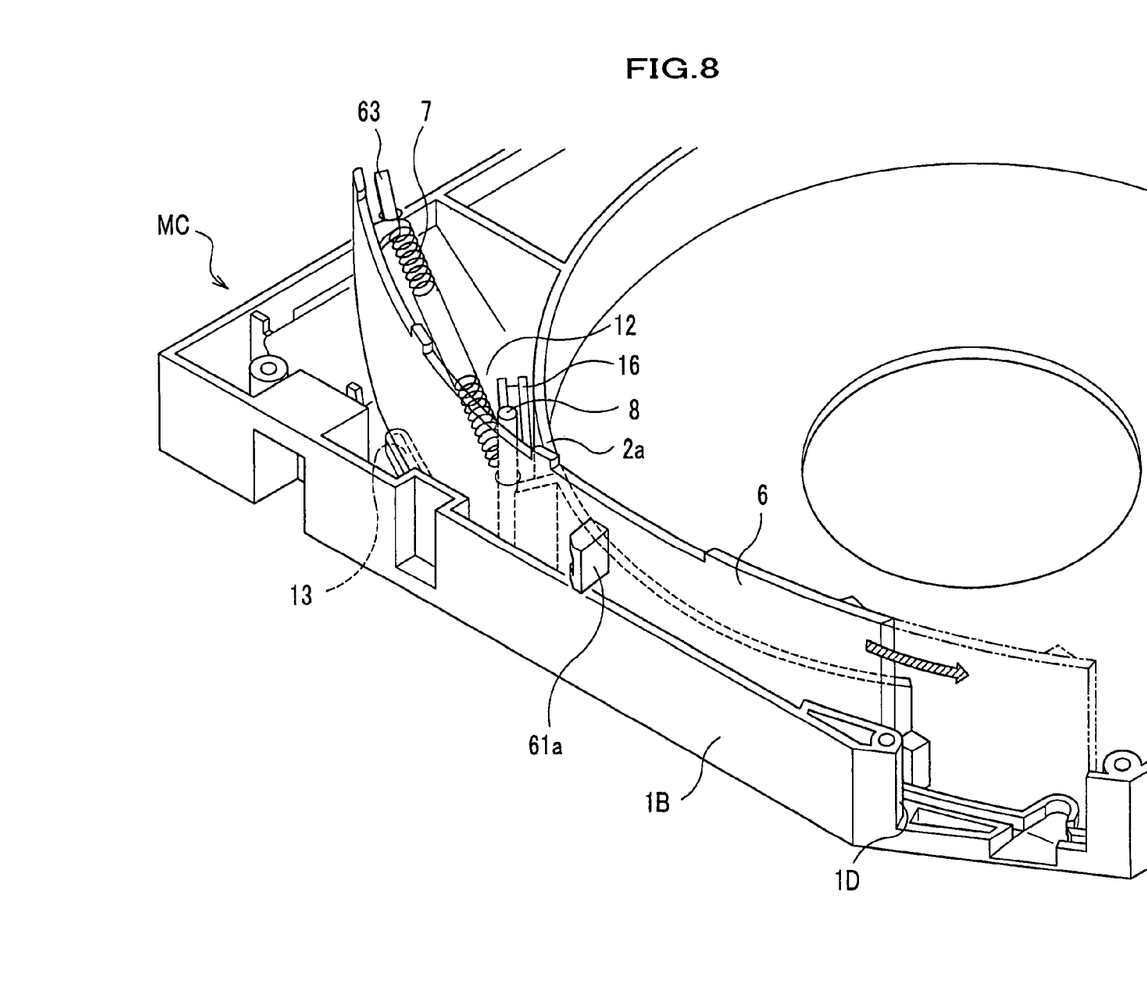
FIG. 8 is an enlarged perspective view showing a main portion of inner surface of a lower half included in the magnetic tape cartridge MC of the second embodiment shown in FIG. 6.

Such a slide door 6 is, as shown in FIG. 8, designed to have a structure that the door 6 is always energized in a closing direction by the tensile coil spring 7 attached across the door-side hooking portion 63 and the case-side hooking portion 8 of the lower half 1B, and is pushed in the closing direction as appropriately through the operating-use protrusion piece 61a attached to the slide door 6, thereby opening/closing a magnetic tape pulling-out port 1D of the cartridge case 1.

Figure 9:
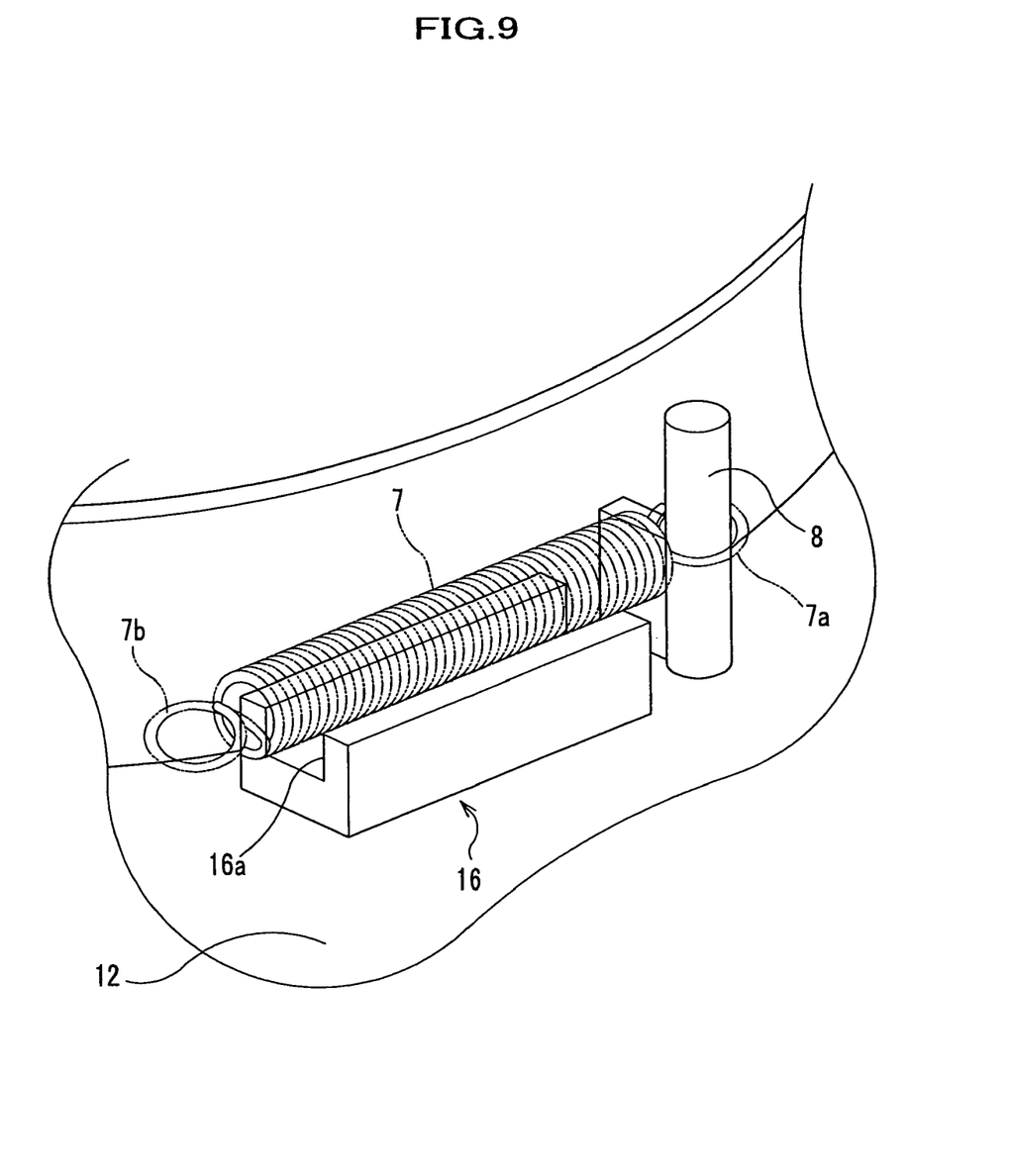
FIG. 9 is a perspective view of the second embodiment showing a spring putting platform and case-side spring hooking portion.
Figure 10:
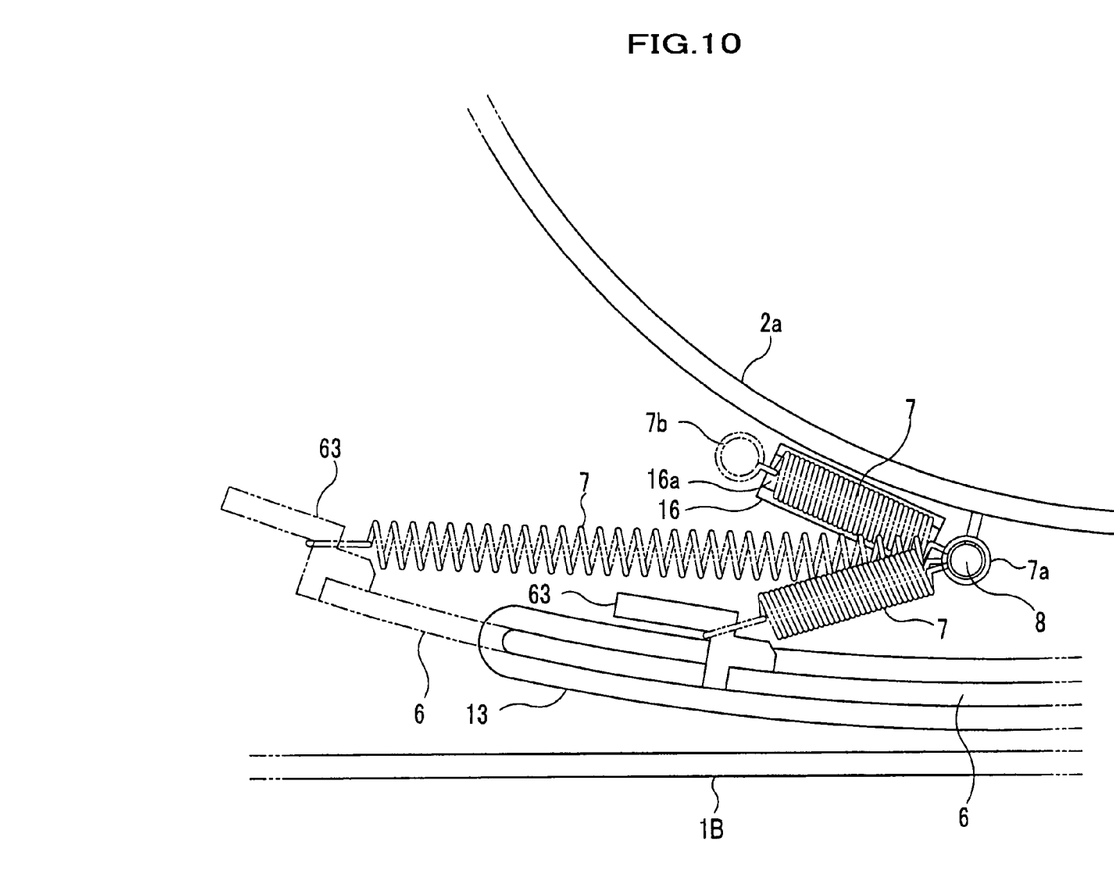
FIG. 10 is a plan view of the second embodiment showing expansion/contraction directions of a tensile coil spring for a position of a spring putting platform.

The tensile coil spring 7 is, as shown in FIG. 9, designed to be provided with ring portions 7a and 7b formed as an approximate ring-shape at its both sides and to be hooked between the door-side hooking portion 63 and case-side hooking portion 8 by the door-side hooking portion 63 composed of the bar-shaped body and the case-side hooking portion 8 composed of the pin-shaped protrusion being inserted, respectively (see FIG. 8). Meanwhile, theses ring portions 7a and 7b need not be completely formed as a ring-shape, and any shapes are available if they have a structure in which the portions 7a and 7b are hooked on the door-side hooking portion 63 and case-side hooking portion 8.

A spring putting platform 16, as shown in FIG. 9, protrudes upward from the bottom surface 12 of the lower half 1B, is composed of a platform component extending lengthwise in one direction along the bottom surface 12, and is disposed at a space between a rib 2a and the guide groove 13 encircling a reel 2 (see FIG. 8). The spring putting platform 16 holds the tensile spring 7 on its upper surface when the spring 7 is hooked across the door-side hooking portion 63 and case-side hooking portion 8.

Then, on the upper surface of the spring putting platform 16, a groove 16a receiving the tensile coil spring 7 is formed along a direction in which the platform 16 extends. When one end ring portion 7a of the spring 7 is hooked on the case-side hooking portion 8, the groove 16a receives and holds the spring 7, thereby preventing the spring 7 from laterally swinging and positioning it in the lower half 1B. The other end ring portion 7b of the spring 7 thus placed on the spring putting platform 16 is run over an end of the platform 16.

A position in which the spring putting platform 16 is disposed is set to be one in which one end port of the groove 16a is opposite to the case-side hooking portion 8. As is clear by also referring to FIG. 10, the expansion/contraction directions of the spring 7 hooked between the door-side hooking portion 63 and case-side hooking portion 8 and the direction in which the groove 16a extends are set to differ. In other words, the platform 16 is disposed at a position where the expanding/contracting coil spring 7 does not fit in the groove 16a, when the spring 7 is hooked between the door-side hooking portion 63 and case-side hooking portion 8.

Figure 11:
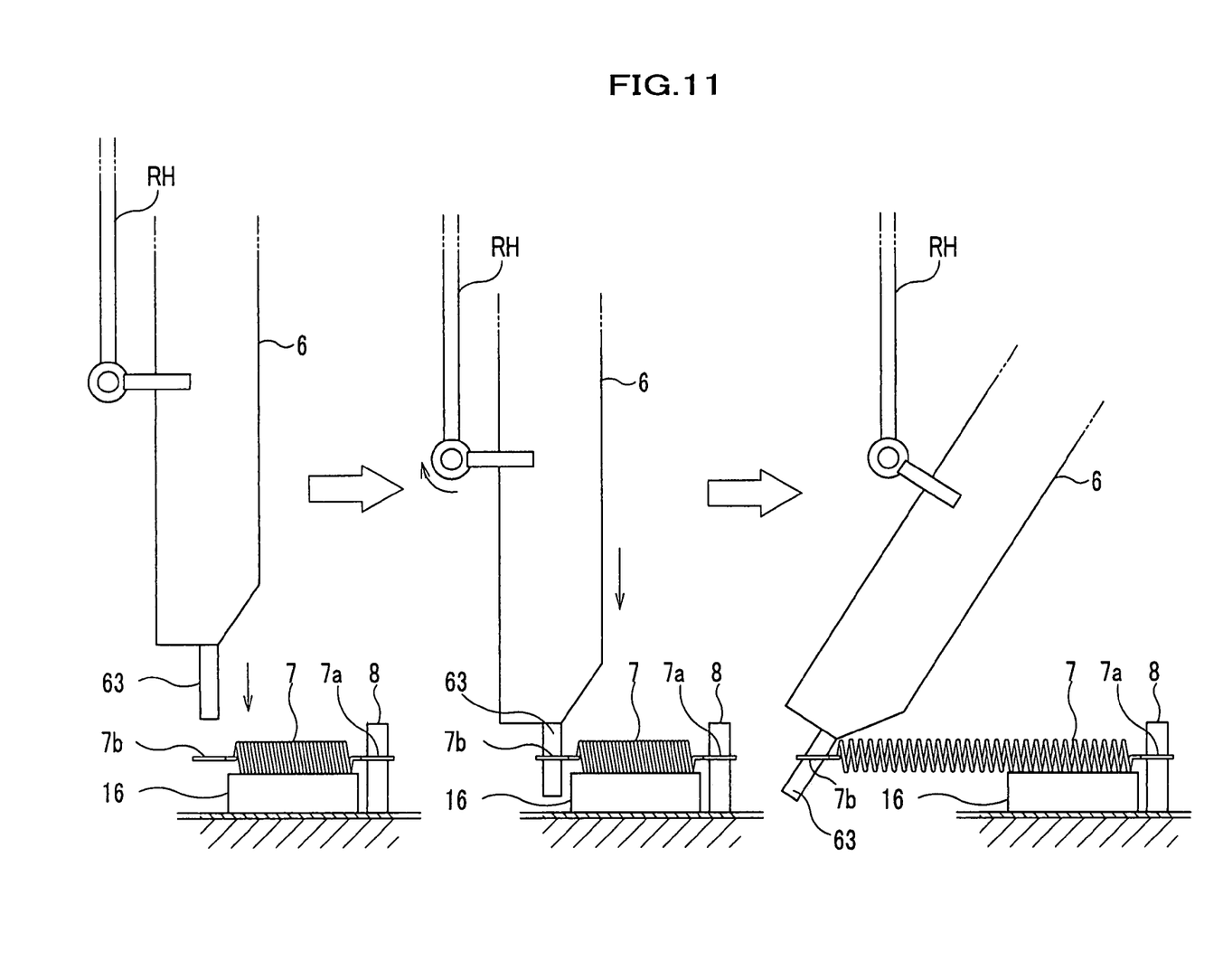
FIG. 11 is a process drawing of the second embodiment showing movements of a robot hand in a case of hooking a tensile coil spring between a door-side hooking portion and case-side hooking portion.

Next, an assembling method of a magnetic tape cartridge related to the invention is described referring to FIG. 11. As for the referred to drawing, FIG. 11 is a process drawing showing movements of a robot hand in the case of hooking a tensile coil spring between a door-side hooking portion and case-side hooking portion.

When assembling the magnetic tape cartridge MC, for example, on a transport pallet, provide each component such as the upper half 1A, lower half 1B, slide door 6, and tensile coil spring 7, and in a building-in process of each component, build each component in a predetermined position of the lower half 1B using an assembling apparatus equipped with a robot hand.

Firstly, in a predetermined step of a series of assembling processes, the tensile coil spring 7 gripped with the robot hand is transported toward the lower half 1B, thereby one end ring portion 7a of the spring 7 being attached to the case-side hooking portion 8 of the lower half 1B, and the spring 7 is placed on the upper surface of the spring putting platform 16. Then, the robot hand nears the lower half 1B from above, thereby fitting the ring portion 7a of the spring 7 in the case-side hooking portion 8, and the transport movement is controlled so that a middle portion of the spring 7 can be received in the groove 16a of the platform 16. Thus, the spring 7 transported by the robot hand, as shown in FIG. 9, is positioned at a predetermined position of the lower half 1B because the ring portion 7a of the spring 7 is supported with the case-side hooking portion 8 and the spring 7 is regulated in a lateral swing by being held with the platform 16.

Next, as shown in FIG. 11, a robot hand RH grips the slide door 6 so that the door 6 maintains a vertical posture directing the door-side hooking portion 63 downward, and transports the door 6 above the spring 7. And the robot hand RH starts to move down when the door-side hooking portion 63 reaches above the ring portion 7b formed at the other end of the spring 7. Then, when the door-side hooking portion 63 is inserted in a ring of the ring portion 7b, the robot hand RH rotates the slide door 6 in a horizontal direction so that the hooking portion 63 scoops up the ring portion 7b. Then the door 6 changes its posture to become horizontal expanding the spring 7.

On the other hand, the robot hand RH performs, paralleling such the movement to change the posture of the door 6, a transport movement to transport the door 6 above the guide groove 13. And when the door 6 reaches above the groove 13 and becomes horizontal, it is fitted in the groove 13 by the robot hand RH moving down. Then, after the building-in process of the door 6 finishes, other predetermined components are built in, whereby the assembling processes of the magnetic tape cartridge are finished.

Thus, although the embodiments of the present invention are described, the invention is not limited to such the embodiments and various variations are available as far as they are based on the technical ideas of the invention.

In the embodiments, although the end portions 7a and 7b of the tensile coil spring 7 are composed of approximately ring-shaped ring portions 7a and 7b, the portions may be composed of hook-shapes.

In the second embodiment, although the spring putting platform 16 in which the groove 16a is formed is used, a spring putting platform which, on its upper surface, forms a plurality of protrusions sideways supporting the tensile coil spring 7 placed on the platform may be used.

What is claimed is:

1. A magnetic tape cartridge comprising:
   a cartridge case consisting of an upper half and a lower half;
   a magnetic tape pulling-out port formed at a corner of side wall of said cartridge case;
   a curved door opening/closing said magnetic tape pulling-out port;

a guide groove guiding said door to universally slide in the door's opening/closing directions;

a door-side spring hooking portion protrusively provided with said door;

a case-side spring hooking portion formed in an inner surface of said cartridge case;

a tensile coil spring, of which one end of the tensile coil spring is hooked in said door-side spring hooking portion and the other end of the tensile coil spring is hooked in said case-side spring hooking portion, energizing said door to a closing position of said magnetic tape pulling-out port; and a spring putting platform provided neighboring said door-side spring hooking portion, and for receiving said tensile coil spring in a state in which said tensile coil spring is temporarily assembled on in said door-side spring hooking portion.

2. A magnetic tape cartridge according to claim 1, wherein said spring putting platform slants so that a tensile coil spring placed on said spring putting platform positions at a lower side for a built-in state thereof.

3. A magnetic tape cartridge according to claim 2, wherein a groove regulating said tensile coil spring at a constant position is formed on said spring putting platform.

4. A magnetic tape cartridge according to claim 3, wherein when said tensile coil spring is placed, the other end portion of said tensile coil spring is set at a length positioning outside said spring putting platform.

5. A magnetic tape cartridge according to claim 2, wherein when said tensile coil spring is placed, the other end portion of said tensile coil spring is set at a length positioning outside said spring putting platform.

6. A magnetic tape cartridge according to claim 1, wherein a groove regulating said tensile coil spring at a constant position is formed on said spring putting platform.

7. A magnetic tape cartridge according to claim 6, wherein when said tensile coil spring is placed, the other end portion of said tensile coil spring is set at a length positioning outside said spring putting platform.

8. A magnetic tape cartridge according to claim 1, wherein when said tensile coil spring is placed, the other end portion of said tensile coil spring is set at a length positioning outside said spring putting platform.

9. A magnetic tape cartridge assembling method according to claim 1, the method comprising the steps of:
  a first step hooking one end portion of said tensile coil spring in said door-side spring hooking portion of said door;
  a second step placing said tensile coil spring on said spring putting platform;
  a third step nearing said door to said guide groove and hooking said other end portion of said tensile coil spring in said case-side spring hooking portion; and
  a fourth step fitting said door in said guide groove expanding said tensile coil spring.

10. A magnetic tape cartridge assembling method according to claim 9, wherein when nearing said door to said guide groove in said third step, said tensile coil spring grips said door slanted for said lower half so as to become same in a slant as a built-in state of the tensile coil spring.

11. A magnetic tape cartridge assembling method according to claim 10, the method comprising the steps of:
  a first step hooking one end portion of said tensile coil spring in said case-side spring hooking portion;
  a second step placing said tensile coil spring on said spring putting platform;
  a third step hooking the other end of said tensile coil spring in said door-side spring hooking portion; and
  a fourth step fitting said door in said guide groove.

12. A magnetic tape cartridge assembling method according to claim 11, wherein the other end of a tensile coil spring placed on said spring putting platform is run over outside the spring putting platform.

13. A magnetic tape cartridge according to claim 1, wherein said spring putting platform comprises a plurality of protrusions supporting said tensile coil spring sideways.

14. A magnetic tape cartridge comprising:
  a cartridge case consisting of an upper half and a lower half;
  a magnetic tape pulling-out port formed at a corner of side wall of said cartridge case;
  a curved door opening/closing said magnetic tape pulling-out port;
  a guide groove guiding said door to universally slide in the door's opening/closing directions;
  a door-side spring hooking portion composed of a protrusive pole-shaped body from an end portion of said door opening direction side farther toward an opening direction side;
  a case-side spring hooking portion formed in an inner surface of said cartridge case;
  a tensile coil spring, of which one end of the tensile coil spring is hooked in said door-side spring hooking portion and the other end of the tensile coil spring is hooked in said case-side spring hooking portion, energizing said door to a closing position of said magnetic tape pulling-out port; and
  a spring putting platform for receiving said tensile coil spring on an upper surface of the spring putting platform in a state in which said tensile coil spring is temporarily assembled on said case-side spring hooking portion formed in an inner surface of said cartridge case.

15. A magnetic tape cartridge according to claim 14, wherein said spring putting platform comprises a groove regulating said tensile coil spring in a constant position.

16. A magnetic tape cartridge according to claim 15, wherein, on said spring putting platform, said groove extends to a different direction from expanding/contracting directions of said tensile coil spring hooked between said door-side spring hooking portion and said case-side spring hooking portion.

17. A magnetic tape cartridge according to claim 16, wherein when said tensile coil spring is placed on said spring putting platform, the other end portion of said tensile coil spring is set at a length positioning outside said spring putting platform.

18. A magnetic tape cartridge according to claim 15, wherein when said tensile coil spring is placed on said spring putting platform, the other end portion of said tensile coil spring is set at a length positioning outside said spring putting platform.

19. A magnetic tape cartridge according to claim 14, wherein when said tensile coil spring is placed on said spring putting platform, the other end portion of said tensile coil spring is set at a length positioning outside said spring putting platform.

20. A magnetic tape cartridge according to claim 14, wherein said spring putting platform comprises a plurality of protrusions supporting said tensile coil spring sideways.

* * * * *